United States Patent Office 3,450,001
Patented June 17, 1969

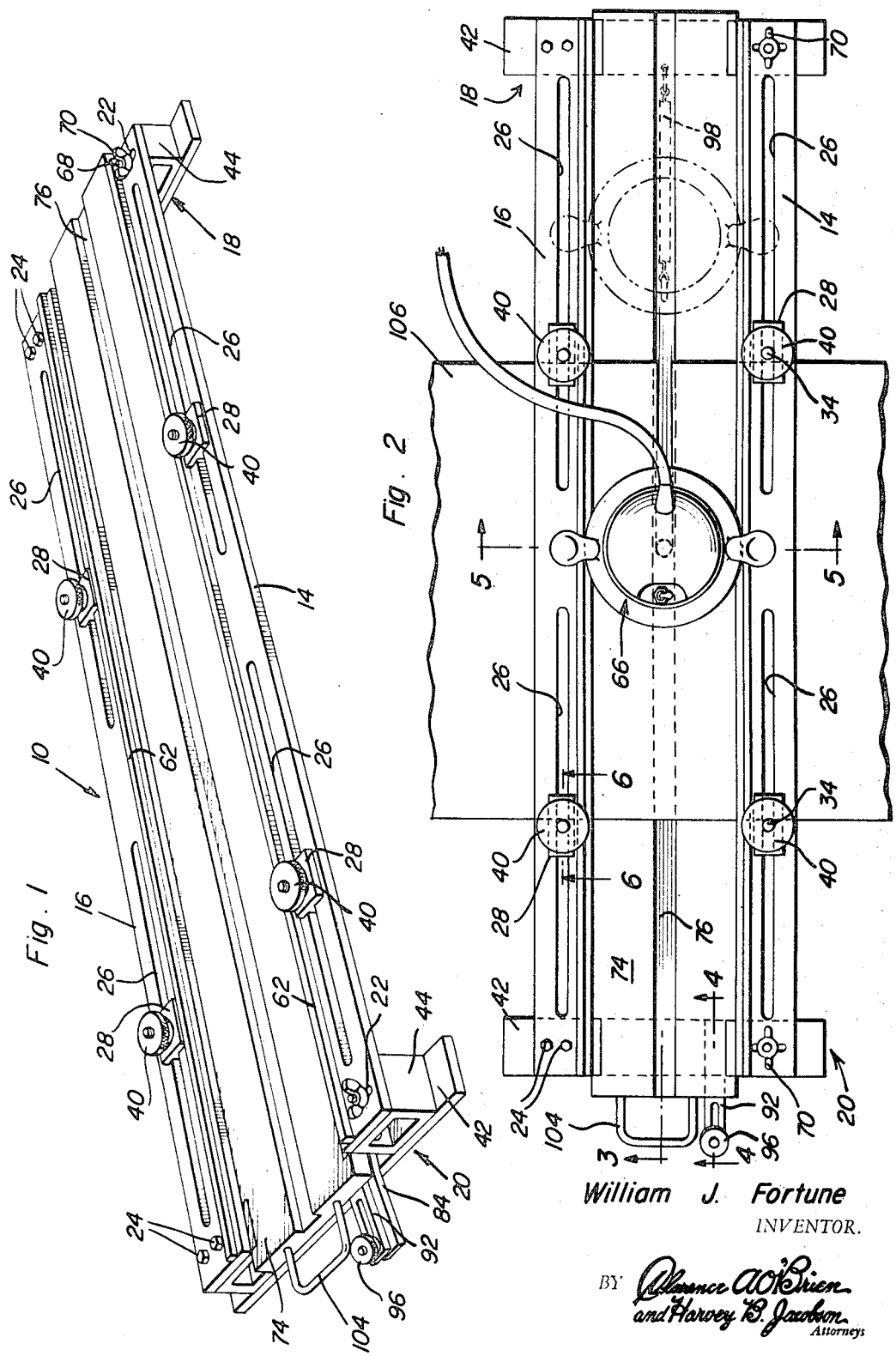

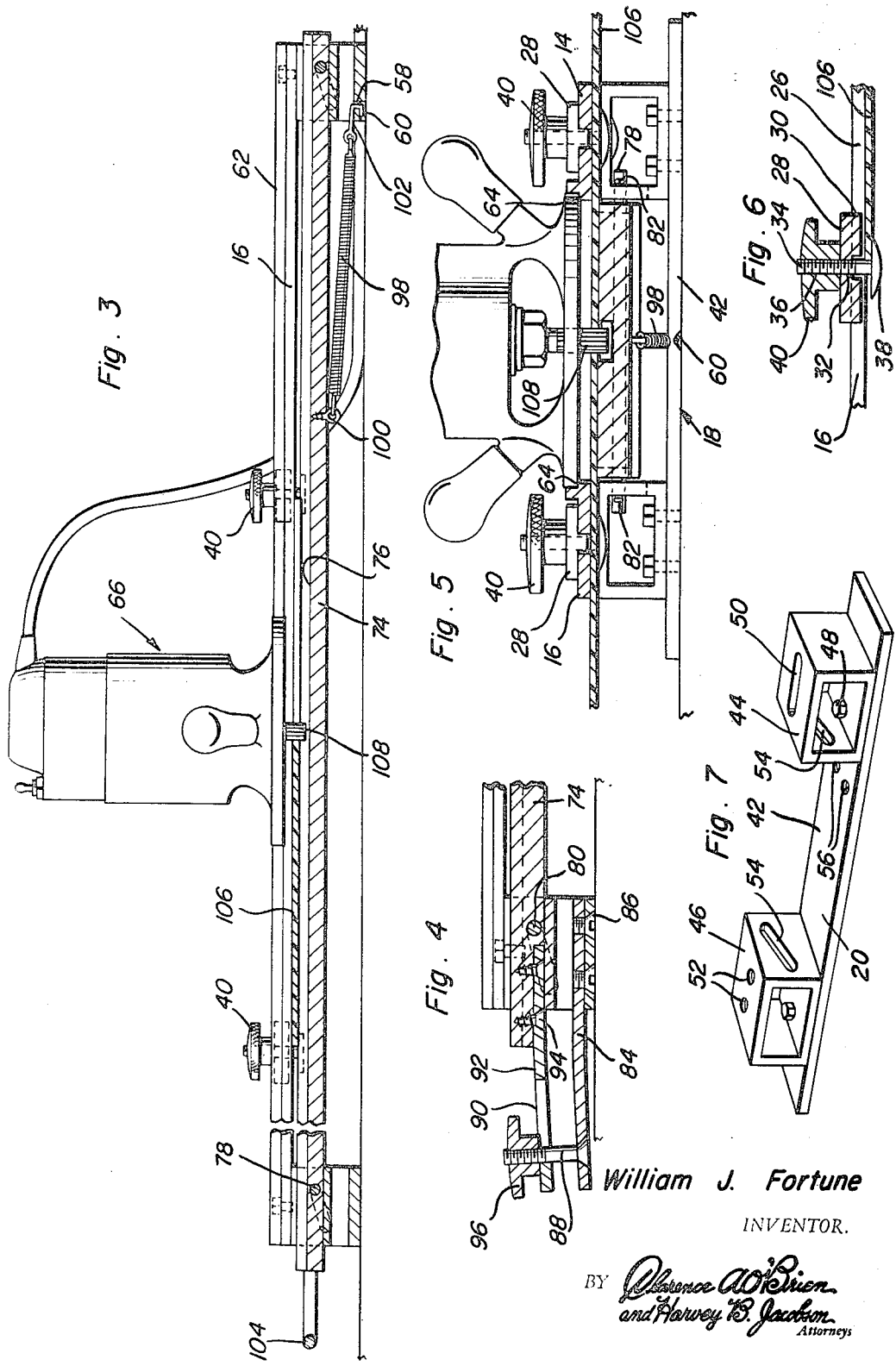

3,450,001
GUIDE AND WORK HOLDER FOR MAKING ROUTER CUTS
William J. Fortune, 946 S. 5th W.,
Missoula, Mont. 59801
Filed Mar. 31, 1967, Ser. No. 627,373
Int. Cl. B23c 1/20; B27c 5/10, 5/04
U.S. Cl. 90—12                    4 Claims

ABSTRACT OF THE DISCLOSURE

A work holder for holding relatively thin sheets of rigid material to be cut or grooved by a router and including means for guiding a router during the process of cutting or grooving the panel-like workpiece, the holder including parallel guide portions for supporting an associated router therefrom and guiding the router longitudinally therealong and also holding means for engaging a panel-like workpiece and supporting the latter from beneath and in position beneath the parallel guide portions by structure operative to automatically compensate for various thickness of panel-like workpiece to be supported thereby.

---

The router guide and work holder of the instant invention has been specifically designed to provide a means whereby panel-like material of various thicknesses may be readily supported and held in proper position for cutting or grooving by a router assembly guidingly engaged with the holder for movement of the associated router along a predetermined path relative to the holder during grooving or cutting operations. In this manner, an extremely versatile work holder and router guide is provided for use in numerous environments.

The main object of this invention is to provide a work holder and router guide capable of supporting a panel-like workpiece to be cut or grooved by a router and including guide means for guiding an associated router along a prescribed path relative to the holder during grooving or cutting operations being performed on the workpiece held by the holder.

Another object of this invention, in accordance with the immediately preceding object, is to provide a work holder including structural features thereof which will automatically compensate for various thicknesses of panel-like workpieces held thereby.

A still further object of this invention is to provide an apparatus in accordance with the preceding objects and which may be readily constructed so as to be adaptable for use in conjunction with various types of routers.

A final object of this invention to be specifically enumerated herein is to provide a guide and work holder in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the guide and work holder of the instant invention;

FIGURE 2 is a top plan view of the guide and work holder with a router operatively associated therewith and being utilized to cut a piece of sheet material supported from the work holder;

FIGURE 3 is an enlarged longitudinal vertical sectional view taken substantially upon the plane indicated by the section line 3—3 of FIGURE 2;

FIGURE 4 is an enlarged fragmentary vertical sectional view taken substantially upon a plane indicated by section line 4—4 of FIGURE 2;

FIGURE 5 is an enlarged fragmentary vertical sectional view taken substantially upon the plane indicated by section line 5—5 of FIGURE 2;

FIGURE 6 is an enlarged fragmentary vertical sectional view taken substantially upon the plane indicated by section line 6—6 of FIGURE 2; and FIGURE 7 is a perspective view of one of the transverse end assemblies of the work holder.

Referring now more specifically to the drawings the numeral 10 generally designates the guide and work holder of the instant invention. The guide and work holder 10 includes a pair of opposite side longitudinal members 14 and 16 which are similar in construction but differ slightly in a manner to be hereinafter more fully set forth. A pair of transverse end assemblies are generally referred to reference numerals 18 and 20 and are also similar but slightly different in construction.

The opposite side members 14 each comprise elongated plate-like members and the opposite ends of the members 14 are provided with transverse slots 22 while the opposite ends of the side members 16 are provided with pairs of transversely spaced apertures (not shown) through which fasteners 24 are secured. Further, the side members 14 and 16 generally parallel each other and are transversely spaced apart. Each of the members 14 and 16 includes a pair of opposite end elongated slots 26 and each of the slots 26 has a slide follower 28 operatively associated therewith and including a depending rib portion 30 slidingly received in the corresponding slot 26. The slid followers 28 have upstanding bores 32 formed therethrough and the upwardly projecting externally threaded shank portion 34 of a fastener 36 having a diametrically enlarged head 38 on its lower end is passed upwardly through each of the bores 32 and a threaded thumb nut 40 is threadedly engaged on the upper end portion of each shank portion 34.

The end assemblies 18 and 20 each include an elongated base plate 42 extending transversely of and beneath the corresponding ends of the side members 14 and 16 and a pair of short rectangular tubing sections 44 and 46 are secured to the opposite ends of each of the base plates 42 by means of suitable fasteners 48 secured through the bottom wall portion of the tubular sections and threadedly engaged in the corresponding base plate 42. The tubular sections 44 and 46 extend transversely of the corresponding base plates 42 and the upper wall portion of the tubular sections 44 are provided with transverse slots 50 while the upper wall portions of the tubular sections 46 are provided with pairs of transversely spaced smooth bores 52. Further, the adjacent side walls of each pair of corresponding tubular sections 44 and 46 are provided with inclined slots 54 for a purpose to be hereinafter more fully set forth and the base plate 42 of the assembly 20 includes a pair of transversely spaced bores 56 disposed intermediate the corresponding sections 44 and 46 while the base plate 42 of the end assembly 18 includes a small diameter bore 58 whose lower end is communicated with one end of a downwardly opening and transversely extending notch 60 opening through the edge of the base plate 42 of the end assembly 18 adjacent the end assembly 20.

The adjacent marginal edge portions of the side members 14 and 16 include parallel upstanding longitudinally extending guide ribs 62 spaced slightly from the adjacent side edge portions of the side members 14 and 16 so as to define a pair of parallel ledges 64 from which opposite side portions of a conventional router assembly generally referred to by the reference numeral 66 may be supported and guided during movement of the router assembly 66 longitudinally of the guide and work holder 10.

The opposite end portions of the side members 16 are secured to the upper wall portions of the tubular sections 46 by means of the fasteners 24 secured through the opposite ends of the side member 16 and the bores 52. Further, the side member 14 is secured to the upper wall portion of the tubular section 44 by means of fasteners 68 including threaded wing nuts 70 secured through the slots 22 and 50.

An elongated panel 74 which may be constructed of any suitable material such as lightweight metal or wood is horizontally disposed between the side member 14 and 16 with its opposite end portions received between the corresponding pairs of tubular sections 44 and 46. The upper surface of the panel is provided with an open-ended longitudinally extending and upwardly opening groove 76 and one end of the panel 74 has a support rod 78 secured therethrough. The opposite end portions of the support rod 78 project outwardly beyond the corresponding side edge portions of the panel 74 and are slidably received in the corresponding slots 54. In addition, the other end of the panel 74 has a similar rod 80 secured therethrough including outwardly projecting opposite end portions slidably received in the slot 54 formed in the tubular sections 44 and 46 of the end assembly 20, the rods 78 and 80 being secured through the associated slots 54 by means of removable fasteners 82, see FIGURE 5.

One end of an elongated strap-like anchor arm 84 is secured to the space plate 42 of the end assembly 20 by means of fasteners 86 secured through the bores 56 and threadedly engaged in the anchor arm. The free end of the anchor arm 84 is slightly angulated and supports therefrom an upwardly projecting threaded shank 88 slidably received through a longitudinal slot 90 formed in one end of a similar anchor arm 92 having its other end portion secured to the undersurface of the adjacent end of the panel 74 by means of fasteners 94. The threaded upper end of the shank or shank portion 88 has threaded thumb nut 96 threadedly engaged therewith. Accordingly, it may be seen that the thumb nut 96 may be turned so as to limit upward movement of the anchor arm 92 relative to the anchor arm 84 during longitudinal shifting of the panel 74 to the right as viewed in FIGURE 4 of the drawings. Of course, as the panel 74 shifts to the right, the pins 78 and 80 cause the panel 74 to be raised relative to the end assemblies 18 and 20.

An expansion spring 98 has one end anchored to the panel 74 intermediate its opposite ends by means of an anchor member threadedly engaged with the under portion of the panel 74 and the other end of the expansion spring 98 includes an anchoring hook 102 having one free end portion hooked through the bore 58 and seated in the notch 60, see FIGURE 3.

In operation, the handle 104 on the end of the panel 74 adjacent the end assembly 20 may be grasped in order to pull the panel 74 toward the left as viewed in FIGURES 3 and 4 of the drawings. Then, since the panel 74 has been lowered in elevation by means of the end portions of the pins 78 and 80 riding in the inclined slots 54 during movement of the panel 74 to the left, the thumb nut 96 may be turned downwardly to abut against the upper surface of the anchor arm 92 thereby preventing the panel 74 from returning to the right under the bias of the spring 98. Then, a thin panel member 106 to be cut by the router assembly 66 may be positioned beneath the side members 14 and 16 and above the grooved upper surface of the panel 74 between the end assemblies 18 and 20. Thereafter, the thumb nuts 40 may be turned upwardly so as to lower the heads 38 and release the slide followers 28 for sliding movement along the side members 14 and 16. Then, the slide followers 28 may be moved toward the adjacent edges of the panel 106 in the manner illustrated in FIGURES 2 and 3 of the drawings and the thumb nuts 40 may be thereafter tightened so as to draw the diametrically enlarged heads 38 into tight frictional engagement with the undersurface portions of the corresponding side edge portions of the panel 106 so as to clampingly support the latter beneath and from the side members 14 and 16. Then, the thumb nut 96 may be turned upwardly so as to allow the biasing action of the spring 98 to shift the panel 74 to the right as viewed in FIGURES 3 and 4 of the drawings so as to raise the upper surface of the panel 74 into tight frictional engagement with the undersurface of the panel 106. Then, the router assembly 66 may be engaged with the ledges 64 at one end of the guide and work holder 10 and moved longitudinally along the latter toward the other end thereof so that the cutting bit 108 thereof, which projects downwardly into the groove 76, may cut through the panel 106.

Of course, inasmuch as the slide followers 28 are each longitudinally adjustable relative to the corresponding side member, the panel 106 may be secured in angulated positions so as to cut diagonally through the panel 106 by means of the router assembly 66. Further, inasmuch as longitudinal shifting of the panel 74 by the biasing action of the spring 98 causes the panel 74 to be elevated relative to the undersurface portions of the side members 14 and 16, the guide and work holder 10 of the instant invention readily and automatically contemplates for different thicknesses of various panels to be cut.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A guide and work holder for making router cuts in panel-like workpieces, said holder including a frame defining laterally spaced apart elongated and generally parallel opposite side portions, including generally planar workpiece engaging under surface portions, said side portions including means adapted to guidingly engage a router for movement along said side portions, said frame also including an elongated panel-like support member generally paralleling said side portions and underlying the central portion of the area extending along and between said side portions, means supporting said support member from said frame for vertical adjustment of said support member relative to said side portions and first work holding means for clampingly engaging a panel-like workpiece between said under surface portions and the upper surface of said support member, whereby the router, including a cutter bit depending between and below said under surface portions may cut a groove in said workpiece as said router moves along said side portions, said support member having an elongated upwardly opening groove formed therein located between and generally paralleling said side portions adapted to receive the lower end of said cutter bit therein, said frame also including second work holding means, independent of said support member, adapted to stationarily clampingly support said panel-like workpiece to the under surface portions of said side portions.

2. A guide and work holder for making router cuts in panel-like workpieces, said holder including a frame defining laterally spaced apart elongated and generally parallel opposite side portions, including generally planar workpiece engaging under surface portions, said side portions including means adapted to guidingly engage a router for movement along said side portions, said frame also including an elongated panel-like support member generally paralleling said side portions and underlying the central portion of the area extending along and between said side portions, means supporting said support member from said frame for vertical adjustment of said support member relative to said side portions and first work holding means for clampingly engaging a panel-like workpiece between said under surface portions and the upper surface of said support member, whereby the router, including a cutter bit depending between and below said under surface portions may cut a groove in said workpiece as said router moves along said side portions, said support means including coacting cam and cam follower members supporting said support member from said frame for vertical lateral reciprocation in response to longitudinal reciprocation of said support member relative to said frame, said first work holding means including a member yieldingly urging said support member in its direction of longitudinal movement operative to raise said support member.

3. A guide and work holder for making router cuts in panel-like workpieces, said holder including a frame defining laterally spaced apart elongated and generally parallel opposite side portions including generally planar workpiece engaging under surface portions, said side portions including means adapted to guidingly engage a router for movement along said side portions, said frame also including an elongated panel-like support member generally paralleling said side portions and underlying the central portion of the area extending along and between said side portions, means supporting said support member from said frame for longitudinal reciprocation relative to said frame and vertical shifting relative to said frame in direct response to longitudinal shifting for clampingly engaging a panel-like workpiece between said under surface portions and the upper surface of said support member, whereby the router, including a cutter bit depending between and below said under surface portions, may cut a groove in said workpiece as said router moves along said side portions, said means supporting said support member from said frame including means yieldingly urging said support member in its direction of longitudinal movement relative to said frame operative to raise said support member toward said frame.

4. The combination of claim 3 wherein said frame also includes means, independent of said support member, adapted to stationarily clampingly support said panel-like workpiece to the under surface portions of said side portions, the last mentioned means including a pair of clamp assemblies supported from the opposite end portion of each of said side portions for movement longitudinally therealong and adapted to engage the marginal edge portions of said workpiece disposed between and adjacent said side portions.

References Cited
UNITED STATES PATENTS

| 1,352,196 | 9/1920 | Hunter | 144—136.2 |
| 3,003,527 | 10/1961 | Fortune | 144—134.5 X |
| 3,373,781 | 3/1968 | Grosswald | 143—6.43 X |
| 3,389,724 | 6/1968 | Paul | 143—6.43 X |

FOREIGN PATENTS 19,938  6/1907  Great Britain.

ANDREW R. JUHASZ, *Primary Examiner.*

G. WEIDENFELD, *Assistant Examiner.*

U.S. Cl. X.R.

143—6; 144—136, 144.5